United States Patent [19]

Brassat et al.

[11] 4,426,475

[45] Jan. 17, 1984

[54] STABILIZED POLYAMIDES

[75] Inventors: Bert Brassat; Hans-Josef Buysch; Heinrich Haupt; Karl H. Hermann, all of Krefeld, Fed. Rep. of Germany

[73] Assignee: Bayer Aktiengesellschaft, Leverkusen, Fed. Rep. of Germany

[21] Appl. No.: 446,943

[22] Filed: Dec. 6, 1982

[30] Foreign Application Priority Data

Dec. 16, 1981 [DE] Fed. Rep. of Germany ....... 3149763

[51] Int. Cl.³ .............................................. C08K 5/18
[52] U.S. Cl. .................... 524/255; 524/236; 524/246; 524/256
[58] Field of Search ............. 524/236, 246, 255, 256; 564/430, 434

[56] References Cited

U.S. PATENT DOCUMENTS

| | | | |
|---|---|---|---|
| 2,939,867 | 6/1960 | Ambelang | 524/255 |
| 3,003,995 | 10/1961 | Schule | 524/606 |
| 3,100,765 | 8/1963 | Albert | 564/430 |
| 3,196,180 | 7/1965 | Albert | 524/255 |
| 3,751,472 | 8/1973 | Wheeler | 524/255 |

FOREIGN PATENT DOCUMENTS

| | | |
|---|---|---|
| 1099725 | 1/1962 | Fed. Rep. of Germany . |
| 1123103 | 2/1962 | Fed. Rep. of Germany . |
| 1154938 | 4/1964 | Fed. Rep. of Germany . |
| 84486 | 9/1971 | German Democratic Rep. . |
| 906173 | 9/1962 | United Kingdom . |
| 1530258 | 10/1978 | United Kingdom . |

Primary Examiner—Veronica P. Hoke
Attorney, Agent, or Firm—Connolly and Hutz

[57] ABSTRACT

Stabilized polyamides containing from 0.02 to 5%, by weight of a diphenylamine compound corresponding to the following general formula:

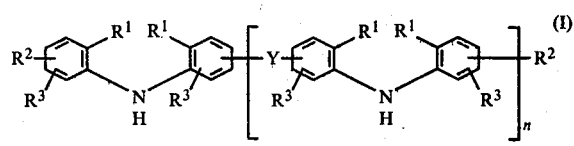

wherein $R^1$ and $R^3$, which may be the same or different, represent hydrogen, a $CH_3-$, $C_2H_5-$ or isopropyl group and $R^3$ is in the o-, m- or p-position to the N-atom substitution;

$R^2$ represents hydrogen, a $C_4-C_{12}$ alkyl, $C_7-C_{12}$ aralkyl or $C_5-C_{12}$ cycloalkyl group and is in the o-, or p-position to the N-atom substitution;

n represents an integer of from 1 to 29; and

Y is a divalent, non-mono-olefinically unsaturated radical having the same meaning as $R^2$ and, in addition, may represent (in a proportion of up to 50 mole percent) $-S-$, $-CH_2-S-CH_2-$, $-CH_2-O-CH-$ or $>CH-R^4$, wherein $R^4$ represents H, $C_1-C_6$ alkyl or $C_5$ or $C_6$ cycloalkyl, and may be in the o- or p-position to the N-atom substitution.

7 Claims, No Drawings

STABILIZED POLYAMIDES

This invention relates to stabilised polyamides containing diphenylamine compounds as stabilisers.

It is known that polyamides may be stabilised against thermal and oxidative degradation by the addition of copper compounds in combination with halogen compounds. In general, however, this adversely affects important electrical properties of the polyamides, such as surface resistance, volume resistivity, dielectric loss factor, tracking resistance and electrical corrosion, to a considerable extent.

In addition, ionic stabilisers frequently migrate in consequence of the water solubility thereof and, in doing so, produce faults, such as spots or discolouration on the surface of polyamide articles. Furthermore, some copper stabilisers are incompatible with certain pigments, particularly sulphur-containing pigments, and are thus capable of undesirably altering the colour of polyamide articles.

Accordingly, non-ionic stabilisers, such as aromatic amino and hydroxy compounds, which do not have the disadvantages mentioned above, have been used. However, these phenolic compounds have an inadequate or only moderate stabilising effect, while the aromatic amino compounds frequently cause serious discolouration on incorporation into the polyamide.

Accordingly, an object of the present invention is to provide highly effective, non-ionic, non-discolouring or substantially non-disclolouring stabilisers based on aromatic amines for polyamides.

It is known that aromatic amines may be used as stabilisers against the thermo-oxidative degradation of polyamides. This class of compounds includes extremely effective types. For example, proposals have been made to use ketone (preferably acetone)/diphenylamine condensates containing 10,10-dimethylacridine as the main product (U.S. Pat. No. 3,003,995); p-phenylene diamines corresponding to the following general formula:

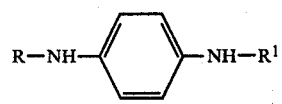

wherein R represents phenyl or naphthyl, and $R^1$ represents a $C_5$-$C_{15}$ cycloaliphatic group (DAS No. 1,099,725); condensates of formaldehyde with aromatic amines corresponding to the following general formulae: Ar—NH—R and

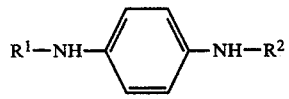

wherein Ar represents an aryl radical; R represents an aromatic, aliphatic or cycloaliphatic radical; $R^1$ and $R^2$, which may be the same or different, represents aromatic, aliphatic or cycloaliphatic radicals (DAS No. 1,123,103).

Nitroaniline, benzidine, p-phenylene-bis-β-naphthylamine and N-phenyl-α- or β-naphthylamine have also been recommended (J. Voigt: "Die Stabilisierung der Kunststoffe gegen Licht und Warme (The Stabilisation of Plastics against Light and Heat)," Springer Verlag 1966, pages 455 et seq.).

Although these products often act as effective stabilisers, they are also attended by serious disadvantages. Thus, the last mentioned products are hardly suitable for use as polyamide stabilisers on the evidence of recent toxicological observations.

In addition, effective stabilisation with aromatic amines is generally accompanied by more or less serious discolouration of the polyamide emanating either directly from the stabiliser, from its incorporation into the polyamide or from the ageing of the finished polyamide article. In either case, this seriously affects both the range of application of polyamide materials and also the range of colours in which they may be finished. Accordingly, aromatic amines causing little or no discolouration would be ideal.

One such product is dioctyl diphenylamine which, although causing little discolouration, has only a weak stabilising effect.

In addition, monomeric stabilisers are capable of migrating to the surface of the moulding.

Accordingly, it has been recommended to use stabilisers of relatively high molecular weight, for example condensation products of aromatic amines with formaldehyde (DAS No. 1,123,103) or condensation products of diphenylamine with acetone (DAS No. 1,152,252=GB-PS 906173). However, these products are also attended by the disadvantage that the effectiveness thereof as stabilisers is often accompanied by a tendency towards serious discolouration.

It has now been found that polyamides may be very effectively stabilised against thermo-oxidative degradation and show no discolouration by the addition of diphenylamine compounds corresponding to the following general formula (I)

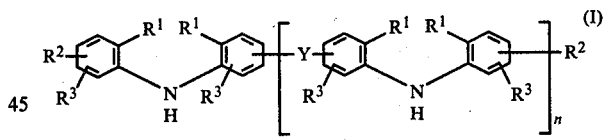

wherein $R^1$ and $R^3$, which may be the same or different, represent hydrogen, a $CH_3$—, $C_2H_5$— or isopropyl group, $R^1$ preferably represents H or $C_2H_5$, $R^3$ preferably represents H and may be in the o-, m- and p-position to the N-atom;

$R^2$ represents hydrogen, a $C_4$-$C_{12}$ alkyl, $C_7$-$C_{12}$ aralkyl or $C_5$-$C_{12}$ cycloalkyl group, preferably hydrogen, a benzyl, styryl, α-methyl styryl, butyl, amyl, isononyl, cyclohexyl or methyl cyclohexyl radical or one of the following radicals:

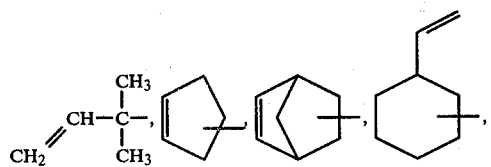

-continued

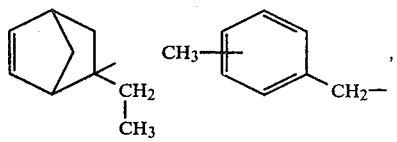

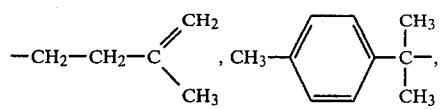

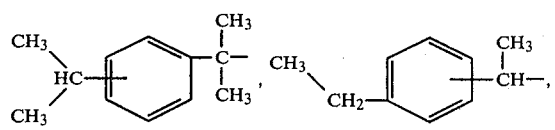

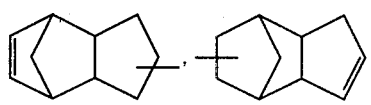

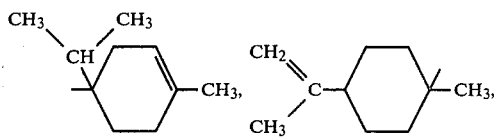

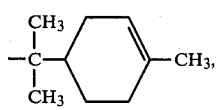

$R^2$ may be in the o- or p-position to the N-atom;

n represents an integer of from 1 to 29, preferably from 1 to 19, more preferably from 1 to 12; and Y represents a bifunctional, non-mono-olefinically unsaturated radical with the same meaning as $R^2$ except for hydrogen and, in addition, may represent (in a proportion of up to 50 mole percent, preferably in a proportion of up to 40 mole percent)—$CH_2$—O—$CH_2$—, —$CH_2$—S—$CH_2$—, —S— or >CH—$R^4$ wherein $R^4$ represents hydrogen, $C_1$-$C_6$ alkyl or $C_5$-$C_6$ cycloalkyl and is in the o- or p-position to the N-atom;

Y preferably represents one of the following radicals

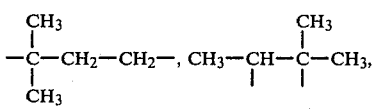

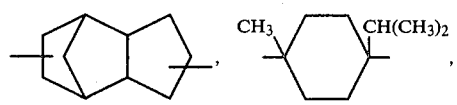

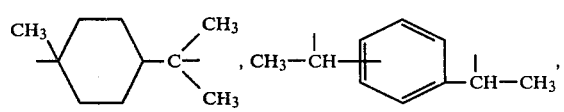

-continued

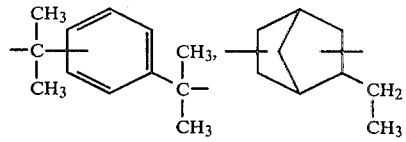

or, in a proportion of up to 50 mole percent, represents =CH—$R^4$.

By virtue of the molecular weight thereof, these stabilisers are largely reisistant to migration, as defined in DAS No. 1,123,103.

The polyamides stabilized in accordance with the present invention show high resistance to thermo-oxidative degradation and a minimal tendency towards discolouration.

The stabilisers used in accordance with the present invention are produced by reacting diphenylamine and/or diphenylamine derivatives corresponding to the following general formula:

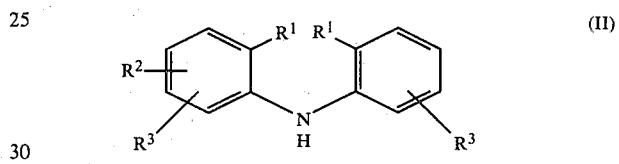

wherein the radicals have the meaning defined above; with bifunctional compounds corresponding to the following general formulae II:

Hal—Y—Hal or $R^3$O—Y—O$R^3$ or $R^3$COO—Y—OCO$R^3$    (II)

(Hal = halogen)

wherein

Y is as defined above;

or with olefins formed from these compounds (II) by elimination of the radical HOH, HO$R^3$, HOCO$R^3$ or H Hal, in the presence of strong acids having a pk$_s$ below 2 at temperatures of from 50° to 300° C., preferably from 120° to 250° C., the radical $R^2$ (where it does not represent H) being able to be introduced before, during or after the above reaction.

The compounds of which the linking unit Y is derived may be used either individually or in the form of mixtures.

The radical $R^2$ is either introduced during the above-described reaction (again in the o- or p-position) by using an excess of the alkylating compound of which $R^2$ is derived or alternatively may even be subsequently introduced by reacting compounds of fromula I which, at the $R^2$ position, also contain hydrogen with a corresponding alkylating compound, such as styrene, α-methyl styrene, benzyl alcohol, cyclohexene, isononylene, isobutylene, under the synthesis conditions described above. Alternatively, a compound which contains the radical $R^2$ is allowed to react in the required molar ratio according to the value required for n, for example 1 mole of the following compound:

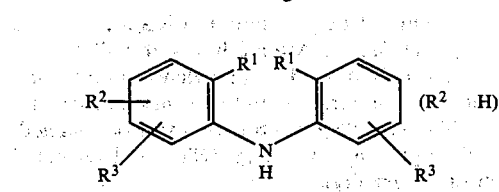

is used per mole of an aromatic amine wherein $R^2=H$ where n is intended to have an average value of 3.

The aromatic amine and the linking reagent are reacted in a molar ratio of from 5:1 to 1:5, preferably from 2:1 to 1:2, more preferably from 1.5:1 to 1:1.5. However, they may also be reacted in other molar ratios. Excess of the reaction components may be removed by distillation after the reaction has been finished.

The reaction of optionally substituted diphenylamine with corresponding unsubstituted compounds is carried out at temperatures of from 50° to 300° C., preferably from 120° to 250° C., in the presence of acid catalysts. According of the present invention, acid catalysts are strong acids having a pK, as measured in water, of less than 2, i.e. strong proton acids, such as hydrochloric acid, hydrobromic acid, sulphuric acid, sulphonic acid, p-toluene sulphonic acid, phosphoric acid, phosphorous acid, trifluoroacetic acid, also Lewis acids, such as aluminium chloride, zinc chloride, iron(III) chloride, titanium tetrachloride, boron trifluoride, antimony pentachloride, and adducts of these Lewis acids, such as BF-etherate, $BF_3$-hydrate, ion exchangers based on cross-linked sulphonated polystyrenes and acid-activated aluminas based on bentonite and montmorillonite.

These catalysts are generally used in quantities of from 0.1 to 20%, by weight, preferably from 0.2 to 10%, by weight, based on the reaction mixture. After the reaction they may be removed by neutralisation, washing out or by filtration. The reaction may be carried out in the presence or absence of diluents and solvents. Suitable solvents are inert to the reactants and must be able to be separated off without difficulty. Examples of suitable solvents are aliphatic and aromatic hydrocarbons, such as decalin, petrol, benzene, toluene, xylene, cumene, tetraline, halogenated aromatic hydrocarbons, such as chlorobenzene, dichlorobenzene, bromobenzene, and ethers such as dioxane and anisole.

The reaction is generally carried out by heating the aromatic amine, optionally in solution, to the reaction temperature after addition of the catalyst, successively adding the alkylating compound and distilling off side products such as water or alcohol. In many cases, the reaction products do not have to be worked-up. However, it is possible as described to remove the catalyst, to distill off volatile constituents and to isolate the reaction product by precipitation or, in certain cases, by crystallization from suitable solvents.

Synthetic polyamides of the type obtained by the polycondensation of diamines with dicarboxylic acids, by the polymerisation of lactams having preferably at least 5 ring atoms or corresponding amino carboxylic acids, may be stabilised with the stabilisers according to the present invention. Aliphatic polyamides, particularly those of adipic acid and hexamethylene diamine or of caprolactam and mixed polyamides of the type in which the components just mentioned are the main constituents are preferably stabilised with the stabilisers according to the present invention.

The stabilisers according to the present invention are used in quantities of from 0.02 to 5%, by weight, preferably from 0.05 to 2%, by weight, more preferably from 0.1 to 1.5%, by weight, based on the polyamide to be stabilised. The stabilisers according to the present invention may be incorporated both before and during polymerisation and also afterwards, being used either as such or in solution in an inert solvent or one of the polyamide-forming starting materials or in the form of a concentrate in a suitable polymer, preferably in polyamide. The stabilisers are preferably incorporated in the polyamide melt using known machines, such as extruders, kneaders, static mixers and stirrers. In addition, various additives of the type normally used, such as lubricants and mould release agents, nucleating agents, pigments, dyes, reinforcing or non-reinforcing fillers, such as mineral fibres, glass and asbestos fibres, microbeads of glass, talcum, silicon dioxide or mica, antistatic agents, plasticisers and UV-stabilisers, may be added to the polyamides.

The polyamides stabilised by the process according to the present invention are eminently suitable for the production of heavy-duty rayon for fishing nets, drive belts, conveyor belts, tyre cord or mouldings which are exposed to thermal stressing in the presence of air or oxygen.

PRODUCTION EXAMPLES FOR THE STABILISERS

EXAMPLE 1

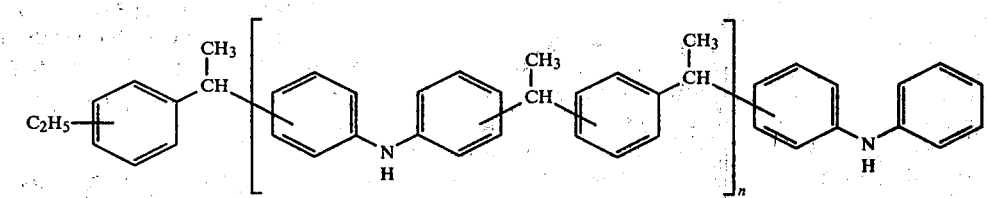

507 g (3 moles) of diphenylamine and 10 g of acid-activated alumina (Tonsil ® Optimum) are heated under nitrogen with stirring to from 200° to 220° C. followed by the dropwise addition over a period of 4 hours of 217 g of technical divinyl benzene (consisting of 61% of m- and p-divinyl benzene and 39% of ethyl vinyl benzene). The temperature is then maintained at 220° C. for 1 hour. The reaction mixture is press-filtered under nitrogen while still hot, the filter cake is washed with hot xylene and then press-filtered. The combined filtrates are concentrated by evaporation and freed from volatile constituents up to a sump temperature of 190° C./15 mbar. The title compound is obtained in the form of a light brown highly viscous resin (710 g).

According to analysis by gel chromatography, the maximum molecular weight amounts to approximately 1800.

EXAMPLE 2

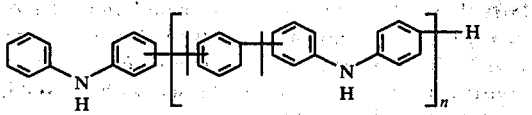

A mixture of 338 g (2 moles) of diphenylamine, 194 g (1 mole) of α,α'-dihydroxy-m-/p-diisopropyl benzene (molar ratio 3:2)) and 10 g of acid-activated alumina is heated with stirring under nitrogen. Water distills over azeotropically beyond a sump temperature of from 120° to 125° C., being distilled off as the temperature increases. Finally, the temperature is maintained at 180° C. for 3 hours. After cooling to 100° C., the reaction product is diluted with toluene and press-filtered while still hot. Washing of the filter cake and concentration of the combined filtrates by evaporation up to a sump temperature of 190° C./15 mbar leaves 480 g of the title compound in the form of a brown soft resin.

EXAMPLE 3

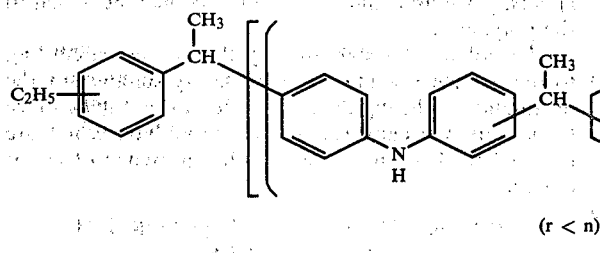

(r < n)

100 g of the compound of Example 1 are dissolved with stirring under nitrogen in isopropanol, heated under reflux with 3 ml of concentrated hydrochloric acid and 12 ml of 35% formalin dropwise to the resulting solution. The deposit precipitated is dissolved by the addition of xylene. After refluxing for 2 hours, the phases are separated, the organic phase is washed with excess dilute sodium hydroxide solution and three times with water, filtered and the organic phase concentrated by evaporation up to a sump temperature of 160° C./20 mbar. A highly viscous brown resin is obtained, becoming brittle on cooling (102 g).

EXAMPLE 4

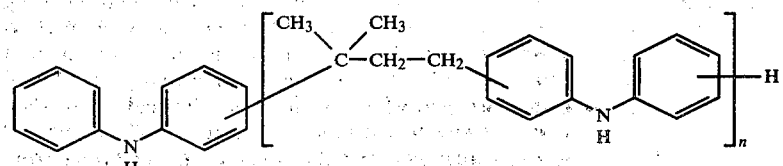

169 g (1 mole) of diphenylamine and 20 g of acid-activated alumina are heated with stirring under nitrogen to 180° C., followed by the addition over a period of from 2 to 3 hours of 68 g (1 mole) of isoprene from a cooled dropping funnel. After 2 hours at 180° C., the reaction mixture is diluted with xylene, filtered and concentrated by evaporation up to a sump temperature of 150° C./30 mbar. 195 g of a brown resin are obtained. Molecular weight approximately 3200 (as determined by gel chromatography).

EXAMPLE 5

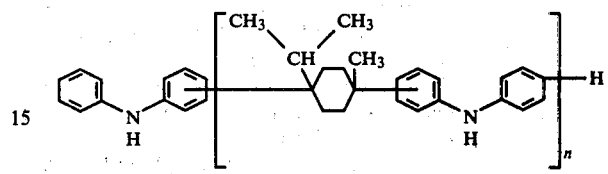

136 g (1 mole) of limonene are added with stirring under nitrogen over a period of 2 hours at from 175° to 180° C. to a mixture of 169 g (1 mole) of diphenylamine and 20 g of acid-activated alumina. After 2 hours at 190° C., the reaction mixture is diluted with xylene, filtered and concentrated by evaporation up to a sump temperature of 190° C./10 mbar, leaving 302 g of a pale yellow resin which has a molecular weight of up to about 2000 (as determined by gel chromatography).

EXAMPLE 6

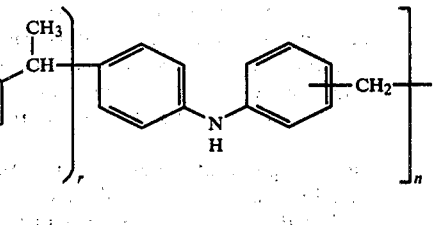

The procedure is as in Example 5, except that 132 g (1 mole) of dicyclopentadiene are used instead of 136 g of limonene. 295 g of a brown resin are obtained.

EXAMPLE 7

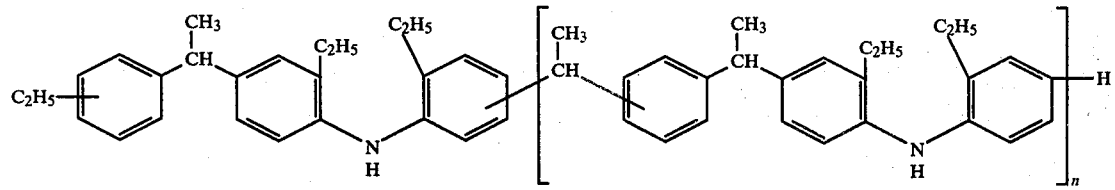

113 g of 2,2'-diethyl diphenylamine and 5 g of acid-activated alumina (Tonsil Optimum) are heated with stirring under nitrogen to form 140° to 145° C., followed by the dropwise addition over a period of 1 hour of 81 g of technical divinyl benzene (cf Example 1). After 2.5 hours at 140° C., the reaction mixture is diluted with xylene, filtered and concentrated by evaporation, leaving a pale brown resin (165 g).

EXAMPLE 8

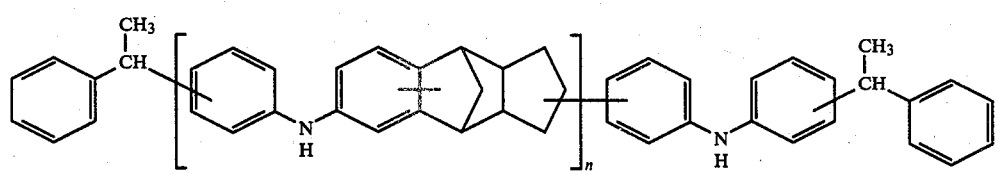

10 g of isoprene are added dropwise with stirring under nitrogen over a period of 4 hours (with interruptions) at 180° C. to 100 g of the product of Example 1 and 3 g of acid-activated alumina in 100 g of o-dichlorobenzene. After another 30 minutes, the product is filtered and concentrated by evaporation up to a sump temperature of 180° C./10 mbar, leaving 108 g of a pale brown resin. Molecular weight up to about 2500 (gel chromatography).

EXAMPLE 9

The procedure is as in Example 8, except that, instead of isoprene, 30 g of limonene are added dropwise over a period of 1 hour, followed by stirring for another 2 hours at 180° C. Working-up gives 120 g of a brittle brown resin having a molecular weight of up to about 2500 (gel chromatography).

EXAMPLE 10

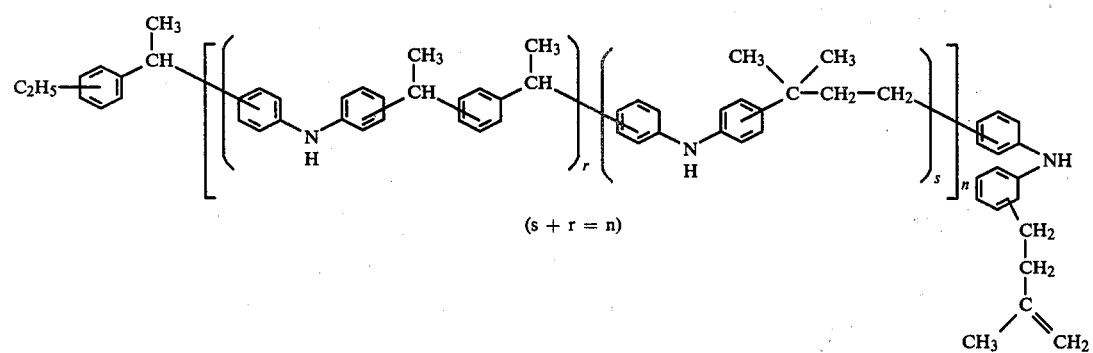

50 g of styrene are added dropwise with stirring under nitrogen over a period of 30 minutes at 150° C. to 100 g of the product of Example 6 and 5 g of acid-activated alumina, after which the reaction mixture is maintained at 150° C. for 3 hours. Filtration and concentration by evaporation up to a sump temperature of 170° C./20 mbar leaves 124 g of a light brown resin.

EXAMPLE 11

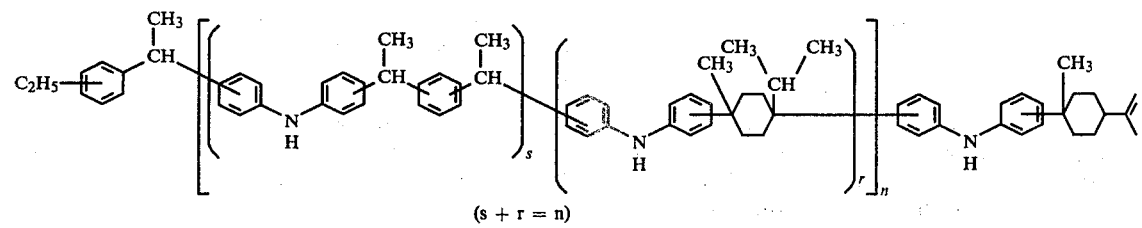

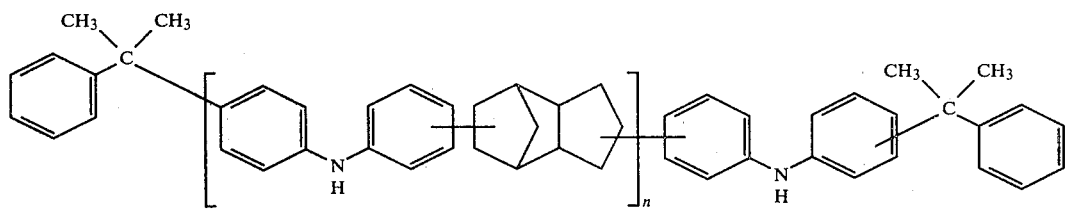

The procedure is as in Example 10, except that 50 g of α-methyl styrene are used instead of styrene. 118 g of a light brown brittle resin are obtained.

EXAMPLE 12

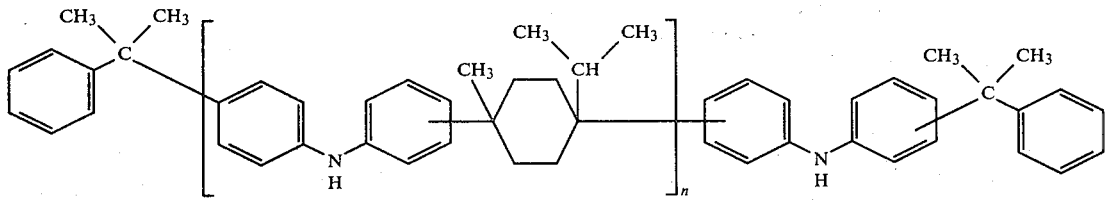

100 g of the product of Example 5 and 5 g of acid-activated alumina are heated with stirring under nitrogen to 150° C., followed by the dropwise addition over a period of 30 minutes of 50 g of α-methyl styrene. After another from 2 to 3 hours at 150° C., the product is filtered while still hot through a pressure filter and concentrated by evaporation up to a sump temperature of 190° C./15 mbar. 135 g of a yellow brittle resin are obtained.

EXAMPLE 13

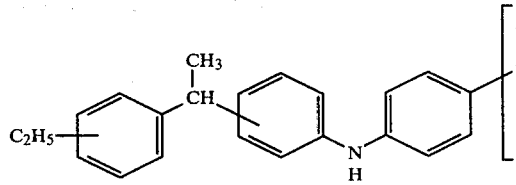

338 g (2 moles) of diphenylamine and 10 g of acid-activated alumina are heated with stirring under nitrogen to 200° C., followed by the dropwise addition over a period of 4 hours at that temperature of 217 g of technical divinyl benzene (cf. Example 1). After 1 hour at 200° C., the reaction mixture is diluted with xylene, filtered through a heated pressure filter and the clear filtrate concentrated by evaporation up to a sump temperature of 180° C./20 mbar, leaving 538 g of a yellow-brown resin.

EXAMPLE 14

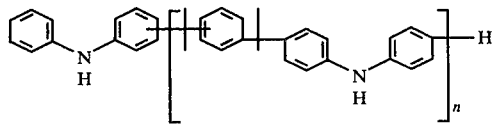

845 g (5 mole) of diphenylamine and 30 g of acid-activated fuller's earth (Tonsil Optimum) are thoroughly melted with stirring under nitrogen (70° C.), 194 g (1 mole) of α,α'-dihydroxy-m/p-diisopropyl benzene (molar ratio approximately 4:3) are added to the resulting melt which is then slowly heated, water distilling off beyond from 110° to 115° C. After about 3 hours, the temperature has reached 165° C. and all the water has distilled over. After 2 hours at 180° C., the reaction mixture is filtered through a pressure filter and excess diphenylamine is distilled off from the clear filtrate at a sump temperature of 170° C./5-8 mbar. The title compound, a clear yellow to light brown hard resin, is left as residue (472 g).

EXAMPLE 15

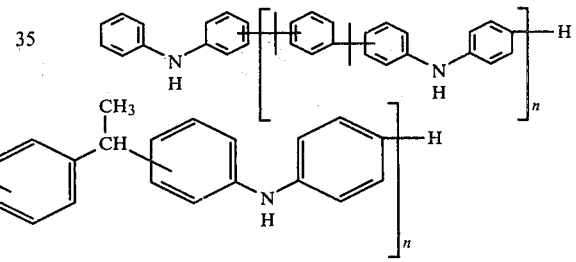

169 g (1 mole) of diphenylamine, 5 g of acid-activated fullers' earth (Tonsil Optimum), 100 ml of xylene and 186 g (corresponding to 1 mole) of a mixture of approximately 50%, by weight, of α,α'-dihydroxy-m/p-diisopropyl benzene (molar ratio in both cases 3:2) are heated with stirring under nitrogen. Water begins to distill off azeotropically at from 115° to 120° C. After from 1 to 2 hours, the temperature has reached 165° C. and all the water of reaction has distilled over. After 2 hours at 180° C., the reaction mixture is diluted with xylene and filtered through a pressure filter. The clear filtrate is freed from solvent at a temperature of up to 150° C./20 bar and from excess diphenylamine at a temperature of up to 190° C./1-2 mbar. The title compound is obtained in the form of a light brown soft resin (292 g).

EXAMPLE 16

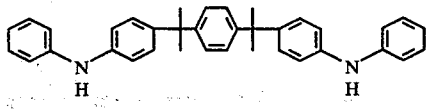

1352 g (8 moles) of diphenylamine and 50 g of acid-activated alumina are heated with stirring under nitrogen to 100° C., followed by the addition of 194 g (1 mole) of α,α'-dihydroxy-p-diisopropyl benzene. The temperature is then increased to 150° C., the water of reaction distilling off. After 1 hour at 150° C., the reaction mixture is heated for 30 minutes to 170° C., filtered through a pressure filter and excess diphenylamine distilled off from the clear filtrate at from 1 to 2 mbar. The sump is taken up in hot xylene. A crystalline product melting at from 170° to 180° C. is obtained on cooling.

EXAMPLE 17

(Comparison)

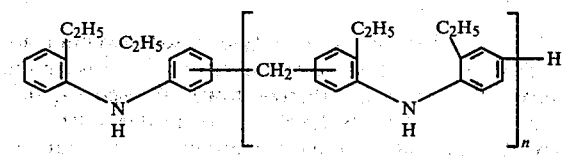

50 g (0.5 mole) of concentrated hydrochloric acid are added dropwise with stirring under nitrogen over a period of 30 minutes at from 80° to 90° C. to 225 g (1 mole) of 2,2'-diethyl diphenylamine, 78 g (0.9 mole) of 35% formaline and 150 ml of xylene. The mixture is heated at from 98° to 100° C., water being removed from the circuit. Finally, the temperature is increased to 170° C. over a period of 7 hours. After dilution with xylene, the hydrochoric acid is neutralised with sodium hydroxide, the phases are separated, the organic phase is washed several times with water and, finally, concentrated by evaporation up to a sump temperature of 180° C./25 mbar. The title compound is obtained in the form of a light brown resin (203 g).

EXAMPLE 18

(Comparison Test according to DAS No. 1,123,103)

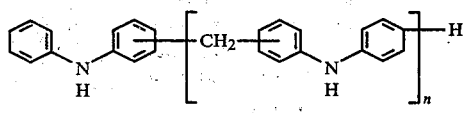

169 g (1 mole) of diphenylamine are dissolved in 300 ml of toluene/butanol (1:1) and the resulting solution heated to 40° C. 50 g (0.5 mole) of concentrated hydrochloric acid are added dropwise with stirring under nitrogen over a period of 30 minutes, 75 g (0.87 mole) of 35% formalin then being added over a period of another 30 minutes. The resulting mixture is stirred for from 6 to 7 hours at from 88° to 90° C.

After neutralisation with sodium hydroxide, the phases are separated, the organic phase is washed with water until free from salts and then concentrated by evaporation up to a sump temperature of 170° C./25 mbar. 180 g of a brown resin are obtained.

EXAMPLE 19

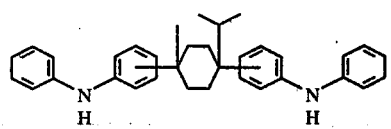

102 g (0.75 mole) of limonene are added dropwise with stirring under nitrogen over a period of 1 hour to a mixture of 592 g (3.5 moles) of diphenylamine and 20 g of acid-activated fuller's earth (Tonsil Optimum), followed by heating for 5 hours to 180° C. and then for 6 hours to 200° C. After filtration through a heated pressure filter, the product is distilled, giving 165 g of a fraction which distills over at 280°–295° C./0.2 mbar and which represents a brittle yellowish resin substantially corresponding to the above formula.

Testing of the stabiliser effect in non-reinforced polyamide-6

To test the stabiliser effect, the substance to be tested was homogeneously incorporated into polyamide-6 ($\eta_{rel}$=4.0) in a concentration of 0.5%, by weight, by passage through an extruder. The thus-stabilised material was injection-moulded to form standard small test bars which were subjected to thermal ageing in air at 150° C.,±0.5° C. After 1, 2, 4, 8 days, etc., 8 standard small test bars were removed and, after cooling for 2 hours in an exsiccator, were tested for impact strength in accordance with DIN 53 453. The test specimens are regarded as having passed the test if at least half of them remain unbroken or if the average impact strength of broken bars is above 30 kJ/m². The stabiliser effect is evaluated by classification in accordance with the following Table:

| Heat ageing time to failure of the impact test | 1 | 2 | 4 | 8 | 16 | etc. days |
|---|---|---|---|---|---|---|
| Effectiveness grade of stabiliser | 0 | 1 | 2 | 3 | 4 | |

The test results of the stabilisers according to the present invention are shown in Table I and those of the comparison products in Table II.

TABLE I

Effectiveness of the stabilisers according to the present invention in polyamide-6

| Stabiliser according to Example No. | Effectiveness grade | Discolouration |
|---|---|---|
| 1 | 4 | slight |
| 2 | 4 | very slight |
| 3 | 4 | slight |
| 4 | 4 | pale yellowish |
| 5 | 3–4 | slight |
| 6 | 3–4 | pale yellowish |
| 7 | 4 | very slight |
| none | 0 | none |
| 13 | 4 | very slight |
| 14 | 4–5 | hardly any |
| 15 | 4 | hardly any |
| 16 | 4–5 | none |
| 19 | 5 | none |

TABLE II

Effectiveness of the comparision products in polyamide-6

| Stabiliser | Effectiveness grade | Discolouration |
|---|---|---|
| Carbazole | 3 | brown |
| p-nitrodiphenylamine | 4 | black |
| N—phenyl-α-naphthylamine | 2 | brown |
| N—phenyl-β-naphthylamine | 4 | brown |
| Diphenylamine-acetone condensation product (Flexamin) relatively high molecular weight product | 3–4 | brown-black |
| p-isopropylamino diphenylamine | 3 | brown |
| according to Example 17) (comparison with Example 7) | 3–4 | red |
| o,o′-diethyl diphenylamine (comparison with Example 7) | 1–2 | slight |
| p,p′-dioctyl diphenylamine | 1–2 | hardly any |
| according to Example 18 | 3–4 | brownish |

The stabilisers according to the present invention are superior to the known compounds in every case in the very slight tendency thereof towards discolouration and the high activity level thereof in every case. In several cases, the products according to the present invention also show improved stabilising properties.

Testing of the stabiliser effect in glass-fibre-reinforced polyamide-6,6

The substances to be tested were incorporated into glass-fibre-reinforced polyamide-6,6 (30% of glass fibres) in a concentration of 0.5% by passage through an extruder. The thus-stabilised material was injection-moulded to form standard small test bars and subjected to thermal ageing in air at 150° C.±1° C. and 120° C.±1° C. After 4,6,8,10 and 12 days etc., 8 standard small test bars were removed and, after cooling for 2 hours in an exsiccator, were tested for impact strength in accordance with DIN 53 453. The plotting of these residual impact strengths against the ageing times gives an ageing curve from which it is possible to see the period (in days) after which the residual impact strength falls below a level of 30 kJ/m². These values, which are referred to hereinafter as the so-called "damage times" $t_{30/150}$ and $T_{30/120}$, are shown in Tables III and IV below or a number of stabilisers according to the present invention and for comparison products. Accordingly, the stabilisers are more effective, the higher the number of days indicated under $t_{30/150}$ and $t_{30/120}$.

TABLE III

Effectiveness of the stabilisers according to the present invention in glass-fibre reinforced polyamide-6,6

| Stabiliser according to Example No. | $t_{30/150}$ | $t_{30/120}$ | Discolouration |
|---|---|---|---|
| 1 | 9 | 140 | hardly any |
| 2 | 6 | — | very little |
| 4 | 9 | 70 | yellowish |
| 5 | 5 | — | very little |
| 6 | 6 | 70 | yellowish |
| 13 | 10 | 70 | hardly any |
| 14 | 12 | 70 | hardly any |
| 15 | 4 | — | slight |
| 16 | — | 50 | hardly any |

TABLE IV

Effectiveness of comparison products in glass-fibre-reinforced polyamide-6,6

| Stabiliser | $t_{30/150}$ | $t_{30/120}$ | Discolouration |
|---|---|---|---|
| Flexamine (Table II) | 5 | 26 | dark brown |
| N—hexylamino-diphenylamine | 6 | 20 | dark brown |
| N—phenyl-p-nitro-aniline (Table II) | 4 | — | black |
| none | — | 7 | none |

Once again, comparison of the stabilisers according to the present invention with known diphenylamine derivatives shows that the compounds according to the present invention afford advantages in terms of the effectiveness thereof as stabilisers for glass-fibre-reinforced polyamide-6,6 and also in terms of colour stability.

Testing of the stabiliser effect in glass-fibre-reinforced polyamide-6

The compounds to be tested were incorporated into glass-fibre-reinforced polyamide-6 (30% of glass fibres) in a concentration of 0.5% by passage through an extruder. The thus-stabilised material was injection-moulding to form standard small test bars which were then subjected to thermal ageing in air at 150°±1° C. After 4, 6, 8, 10 and 12 days, 8 standard small test bars were removed and, after cooling for 2 hours in an exsiccator, were tested for impact strength in accordance with DIN 53 453. The plotting of this residual impact strength against the ageing times gives an ageing curve from which it is possible to see the time (in days) after which the residual impact strength falls below a level of 30 kJ/m². These values, referred to hereinafter as the damage time $t_{30/150}$, are shown in Tables V and VI for a number of stabilisers according to the present invention and for comparison preparations.

TABLE V

Effectiveness of the stabilisers according to the present invention in glass-fibre-reinforced polyamide-6

| Stabiliser | $t_{30/150}$ | Discolouration |
|---|---|---|
| 1 | 9 | hardly any |
| 4 | 7 | hardly any |
| 13 | 9 | hardly any |
| 14 | 7 | hardly any |
| 16 | 9 | hardly any |
| 5 | 5 | slight |
| 6 | 6 | yellowish |

TABLE VI

Effectiveness of comparison products in glass-fibre-reinforced polyamide-6

| Stabiliser | $t_{30/150}$ | Discolouration |
|---|---|---|
| 2-phenylamino-naphthalene | 4 | slight |
| N—isopropyl-p-amino diphenylamine | 8 | brown |
| N,N'—diphenyl-p-phenylene diamine | 7 | brown |
| N—phenyl-p-nitro-aniline | 9 | black-brown |

Comparison of the stabilisers according to the present invention with the known diphenylamine derivatives used for comparison reveals clearly the superiority of the stabilisers according to the present invention in terms of stabiliser effect and/or colour stability.

We claim:

1. A stabilised polyamide containing from 0.02 to 5% by weight based on the polyamide of a diphenylamine compound corresponding to the following general formula:

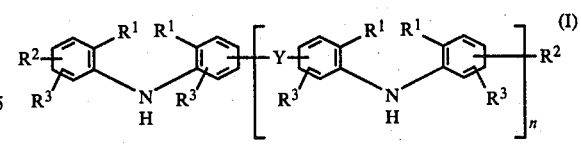

wherein $R^1$ represents hydrogen, methyl, ethyl or isopropyl;

$R^2$ represents hydrogen, $C_4$-$C_{12}$ alkyl, $C_7$-$C_{12}$ aralkyl or $C_5$-$C_{12}$ cycloalkyl and is in the o- or p-position to the nitrogen atom;

$R^3$ represents hydrogen, methyl, ethyl or isopropyl and is in the o-, or m- or p-position to the nitrogen atom;

n represents an integer of from 1 to 29; and

Y represents $C_4$-$C_{12}$ alkylene, $C_7$-$C_{12}$ aralkylene or $C_5$-$C_{12}$ cycloalkylene or up to 50 mole percent of —S—, —$CH_2$—S—$CH_2$—, —$CH_2$—O—$CH_2$ or =CH—$R^4$ wherein $R^4$ represents hydrogen, $C_1$-$C_6$ alkyl or $C_5$ or $C_6$ cycloalkyl and is in the o- or p-position to the nitrogen atom;

2. A stabilised polyamide as claimed in claim 1 containing from 0.05 to 2%, by weight of a diphenylamine compound as defined in claim 1.

3. A stabilised polyamide as claimed in claim 2 containing from 0.1 to 1.5% by weight of a diphenylamine compound as defined in claim 1.

4. A stabilised polyamide as claimed in claim 1 which is an aliphatic polyamide.

5. A stabilised polyamide as claimed in claim 1 which is reinforced with glass fibres in known amounts.

6. A stabilised polyamide as claimed in claim 1 containing a diphenylamine compound as defined in claim 1 wherein $R^2$ represents a member of the groups hydrogen, benzyl, styryl, α-methyl styryl, t-butyl, t-amyl, isononyl, cyclohexyl, methyl cyclohexyl,

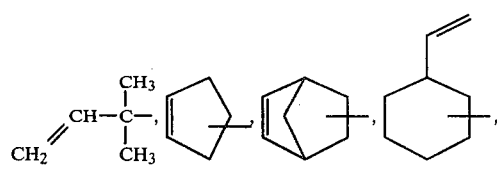

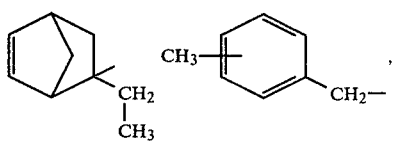

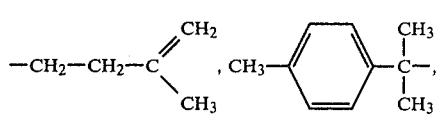

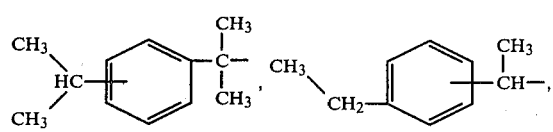

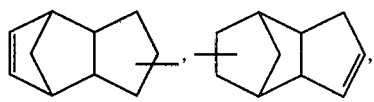

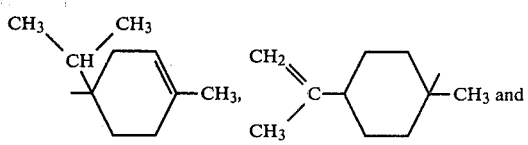

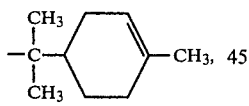

7. A stabilised polyamide as claimed in claim 1 containing a diphenylamine compound as defined in claim 1 wherein $R^1$ represents hydrogen or ethyl; $R^2$ represents a member of the group hydrogen, benzyl, styryl, α-methyl styryl, t-butyl, t-amyl,

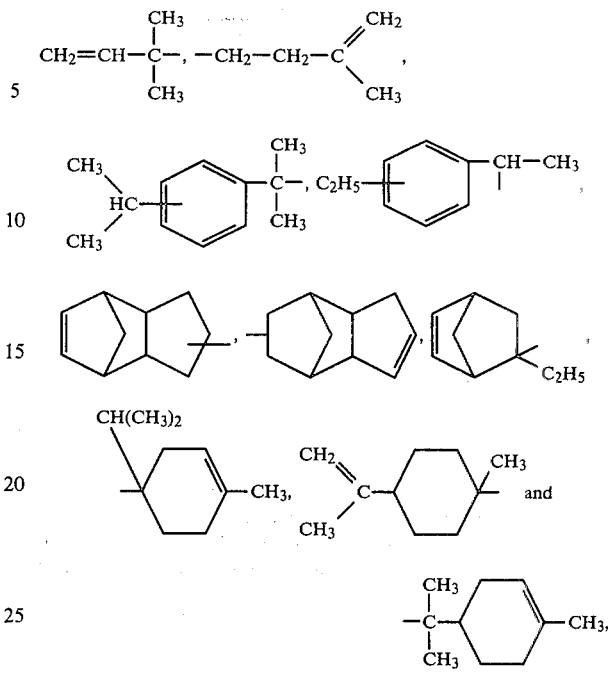

$R^3$ represents hydrogen; n represents an integer of from 1 to 19; and Y represents a member of the groups

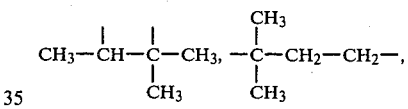

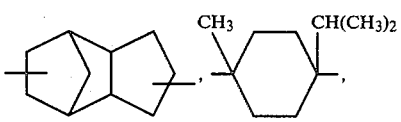

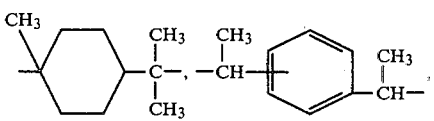

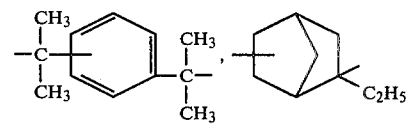

and up to 40 mole percent of $=CH-R^4$ wherein $R^4$ represents hydrogen.